(12) United States Patent
Menon et al.

(10) Patent No.: US 8,484,411 B1
(45) Date of Patent: Jul. 9, 2013

(54) SYSTEM AND METHOD FOR IMPROVING ACCESS EFFICIENCY TO A DYNAMIC RANDOM ACCESS MEMORY

(75) Inventors: Raghavan Menon, Saratoga, CA (US); Raj Mahajan, Campbell, CA (US)

(73) Assignee: Synopsys Inc., Mountain View, CA (US)

( * ) Notice: Subject to any disclaimer, the term of this patent is extended or adjusted under 35 U.S.C. 154(b) by 515 days.

(21) Appl. No.: 12/346,860

(22) Filed: Dec. 31, 2008

Related U.S. Application Data

(60) Provisional application No. 61/018,344, filed on Dec. 31, 2007.

(51) Int. Cl.
*G06F 12/00* (2006.01)

(52) U.S. Cl.
USPC ............ 711/108; 711/E12.017; 711/E12.032; 711/E12.042

(58) Field of Classification Search
None
See application file for complete search history.

(56) References Cited

U.S. PATENT DOCUMENTS

| 5,251,310 | A | * | 10/1993 | Smelser et al. | ............... 711/144 |
| 5,684,978 | A | | 11/1997 | Sarma et al. | |
| 5,778,446 | A | | 7/1998 | Kim | |
| 6,249,851 | B1 | * | 6/2001 | Richardson et al. | .......... 711/167 |
| 6,336,162 | B1 | | 1/2002 | Ueda | |
| 6,757,213 | B2 | | 6/2004 | Kinoshita | |
| 6,820,170 | B1 | * | 11/2004 | Elnathan et al. | ............... 711/108 |
| 6,970,978 | B1 | * | 11/2005 | Wu | ............................... 711/137 |
| 6,983,356 | B2 | * | 1/2006 | Rotithor et al. | ............... 711/213 |

OTHER PUBLICATIONS

Webopedia, "Page", Apr. 11, 2001, pp. 1-2, http://web.archive.org/web/20010411032818/http://www.webopedia.com/TERM/p/page.html.*
Webopedia, "Controller", Apr. 5, 2001, pp. 1-2, http://web.archive.org/web/20010405223746/http://www.webopedia.com/TERM/C/controller.html.*
Jim Handy, (The Cache Memory Book: The Authoritative Reference on Cache Design), Second Edition, 1998, pp. 204-205 and 220-221.*

* cited by examiner

*Primary Examiner* — Edward Dudek, Jr.
*Assistant Examiner* — Christopher Birkhimer
(74) *Attorney, Agent, or Firm* — Evergreen Valley Law Group, P.C.; Kanika Radhakrishnan

(57) ABSTRACT

A method and system for accessing a dynamic random access memory (DRAM) is provided. A memory controller includes a content addressable memory (CAM) based decision control module for determining a next best access request for the DRAM. The CAM based decision control module includes a CAM access storage module for storing access requests, a next access table module for storing the next best access request, and a decision logic module for determining the next best access request based on results from the CAM access storage module and the next access table module. Further, the memory controller includes a DRAM access control interface for implementing signaling required to access the DRAM. The method includes storing access requests in a CAM access storage module. The method includes determining which of the stored access requests is a next best access request. Further, the method includes processing the next best access request.

19 Claims, 4 Drawing Sheets

SYSTEM AND METHOD FOR IMPROVING ACCESS EFFICIENCY TO A DYNAMIC RANDOM ACCESS MEMORY

CROSS REFERENCE TO RELATED APPLICATIONS

This patent application claims priority from provisional patent application No. "61/018,344" titled "Memory Controllers for Memory Devices", filed on Dec. 31, 2007 in the United States Patent and Trademark Office.

FIELD

The present disclosure relates to the field of dynamic random access memory (DRAM) used in electronic devices. More particularly, the present disclosure relates to improving access efficiency to a dynamic random access memory (DRAM).

BACKGROUND

Over a period of time use of memory devices in electronic systems has increased significantly. The memory devices form key components in most of electronic designs. The memory devices, for example, Dynamic Random Access Memory (DRAM) devices, are popular due to their low cost and high volume use. The low cost results from simple and regular structure of the DRAM devices which is easy to manufacture. The memory devices and access to the memory devices are controlled using memory controllers. The memory controllers may be interfaced with the memory devices. The memory controllers provide an access mechanism and implement various timing and control functions for the memory devices. The memory controllers are also offered as pre-designed Intellectual Property (IP) blocks. The more efficient an IP block is the more useful it is. The memory devices require several advanced features to achieve performance levels required by the electronic systems. The advanced features put additional requirements on the memory controllers and make it more difficult for a designer to create the memory controllers. Therefore, an efficient memory controller is required.

In order to increase processing speed of the electronic systems it is necessary to improve access time to the memory devices which in turn puts an additional requirement on the memory controllers. In a conventional memory controller implementation for a memory device an attempt to improve access time is made by taking a stream of access requests and optimizing the access requests to make sure that no access requests to the memory device are wasted. For example, addresses to a same section, such as a row, of a bank of the memory device can be made more quickly than accesses to any other row in the bank. However, only a few (usually just 2 or 3 accesses) optimizations can be made in such memory controller implementation due to the limitation to the length of the stream of the access requests. Further, the memory controller implementation makes use of a traditional state machine to make access priority decisions and the traditional state machine becomes unmanageably complex as multiple accesses are added to a decision mechanism. Hence, an efficient memory controller implementation is desired.

In order to maximize performance in the electronic systems, it is important for the memory device and memory controller to provide both minimum latency and maximum memory bandwidth. Hence, a memory controller implementation that minimizes latency and maximizes bandwidth is desired.

In light of the foregoing discussion there is a need for an efficient approach to optimize requests to the dynamic memory.

SUMMARY

Embodiments of the present disclosure provide a method and system for accessing a dynamic random access memory (DRAM).

An example memory controller includes a content addressable memory (CAM) based decision control module for determining a next best access request for the DRAM. The CAM based decision control module includes a CAM access storage module for storing a plurality of access requests, a next access table module for storing the next best access request, and a decision logic module for determining the next best access request based on results from the CAM access storage module and the next access table module. Further, the memory controller includes a DRAM access control interface for implementing signaling required to access the DRAM.

An example method of accessing a dynamic random access memory (DRAM) includes storing a plurality of access requests in a content addressable memory access storage module. A next best access request is then determined from the stored access requests. Further, the next best access request is then processed.

DETAILED DESCRIPTION

Embodiments of the present disclosure provide a method and system for accessing a dynamic random access memory (DRAM).

Figure 1:
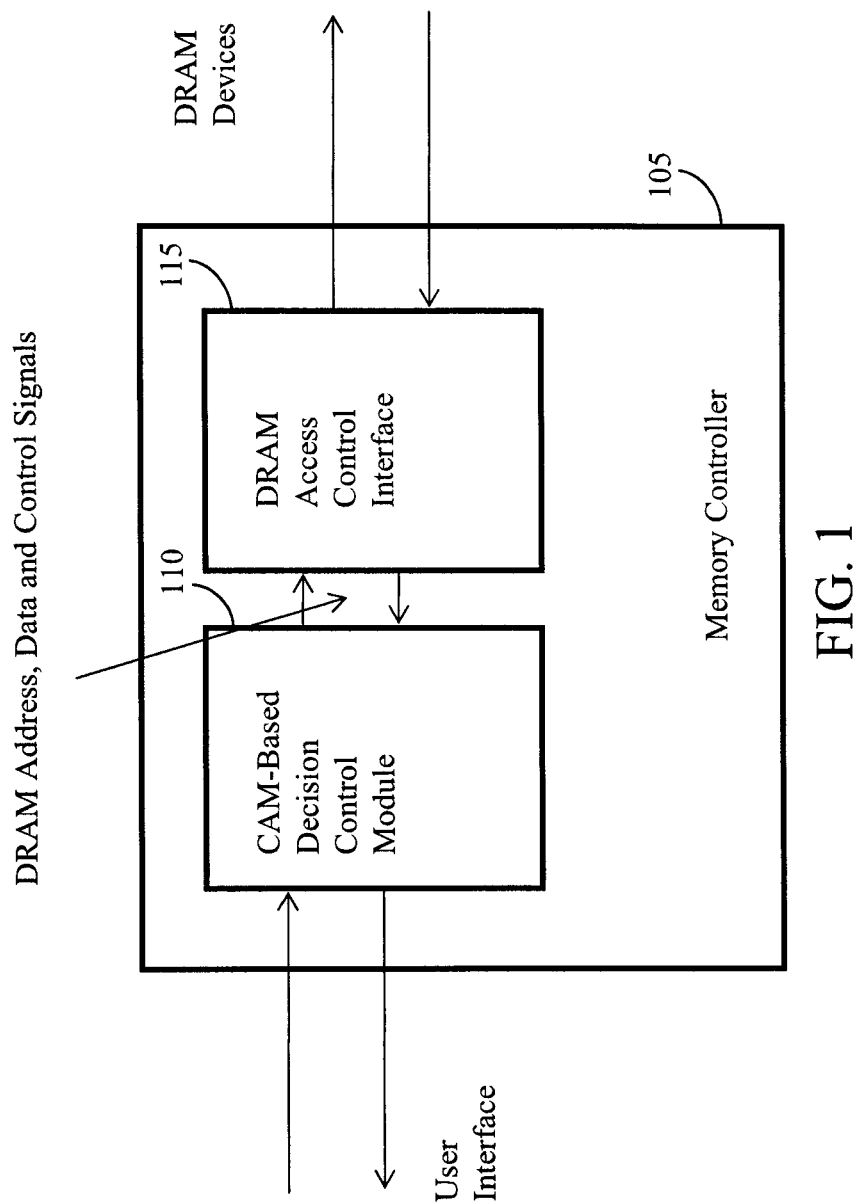
FIG. 1 is a block diagram of a memory controller in accordance with an embodiment of the invention.

FIG. 1 is a block diagram of a memory controller 105 in accordance with an embodiment of the invention. The memory controller 105 is interfaced with one or more memory devices. Examples of the one or more memory devices include but are not limited to Dynamic Random Access Memory (DRAM) devices, Synchronous Dynamic Random Access Memory (SDRAM) devices, Double Data Rate Dynamic Random Access Memory (DDR-DRAM) devices and Double Data Rate Synchronous Dynamic Random Access Memory (DDR-SDRAM) devices. The one or more memory devices may be controlled by control logic of centralized memory controller 105. The memory controller 105 provides an access mechanism and implements various timing and control functions for the one or more memory devices.

In an embodiment, each memory device may include one or more memories and other sub-systems. Each memory may be organized into banks and pages. For example, a DRAM has four or eight banks. Within each bank a particular page may be accessed. Some accesses to the memory may be faster than others. For example, if the page is open or is ready to access then access time for the page is shorter than for other pages in the bank.

In an embodiment, the memory controller 105 is also interfaced with one or more users. The one or more users may make access requests from the memory controller 105 and the memory controller 105 may issue access commands for the one or more memory devices.

In an embodiment, the memory controller 105 is a DRAM memory controller. The content addressable memory (CAM) based architecture for the DRAM memory controller 105 allows a larger access stream to be used for optimization. The memory controller 105 includes hardware and algorithms that are used to select a best access for the one or more memory devices. Once, the access is decided, the memory controller 105 then implements detailed timing and control signal sequences required to implement the access according to standard protocols of the one or more memory devices. The memory controller 105 includes one or more modules for providing an access mechanism and implementing various timing and control functions for the one or more memory devices.

The memory controller 105 includes a CAM based decision control module 110 and a DRAM access control interface 115. The CAM based decision control module 110 is interfaced with the one or more users via a user interface. In an embodiment, the decision control module 110 determines best next access for the one or more memory devices. The CAM based decision control module 110 optimizes an access stream and issues specific accesses to the DRAM access control interface 115.

In an embodiment, the DRAM access control interface 115 is in connection with the one or more memory devices. The DRAM access control interface 115 implements detailed signaling required to access the one or more memory devices. The DRAM access control interface 115 also creates specific signals and timing to control read and write process to the one or more memory devices.

The CAM based decision control module 110 includes one or more modules for performing different functions. The CAM based decision control module 110 including the one or more modules is explained in detail in conjunction with FIG. 2.

Figure 2:
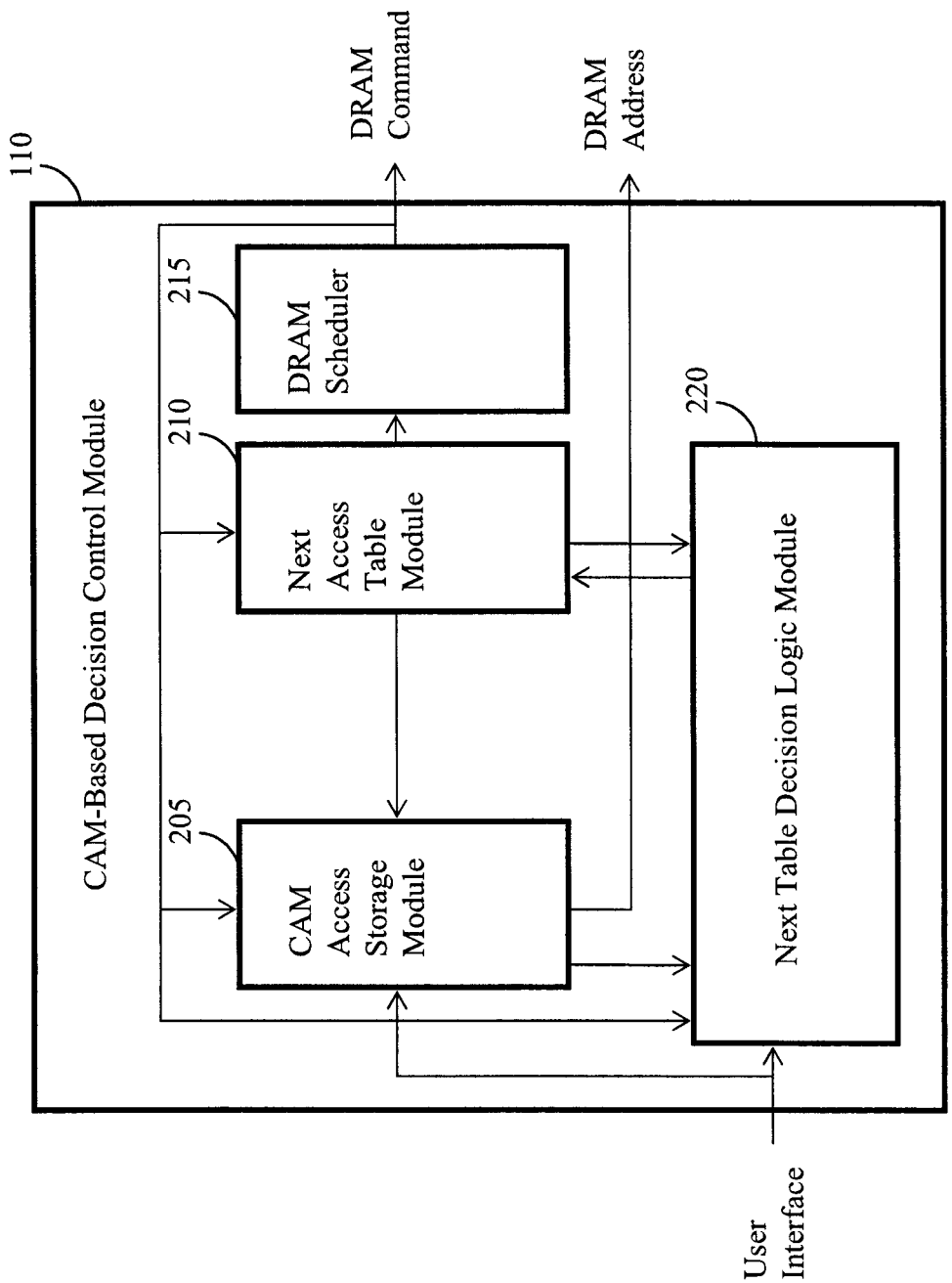
FIG. 2 is a block diagram of a content addressable memory (CAM) based decision control module in accordance with an embodiment of the invention.

FIG. 2 is a block diagram of a content addressable memory (CAM) based decision control module in accordance with an embodiment of the invention. The CAM based decision control module 110 includes a CAM access storage module 205, a next access table module 210, a DRAM scheduler 215, and a next table decision logic module 220.

In an embodiment, the CAM access storage module 205 is used to store each access requested of the controller for the one or more memory devices. The next access table module 210 is used to store a current best access to a specific memory bank. The next access table module 210 is constantly updated when a new access request comes in by comparing the new request to the access requests in the CAM access storage module 205. The CAM access storage module 205 and the next access table module 210 may store data in one or more fields.

In an embodiment, the DRAM scheduler 215 implements a scheduling mechanism that schedules the access requests to the banks in an order as present in the next access table. Further, the DRAM scheduler 215 can be included in the next access table to schedule the access requests.

In an embodiment, the next table decision logic module 220 determines the best access by implementing one or more algorithms. The next table decision logic module 220 uses results from the CAM access storage module 205 and the next access table module 210 to make the determination and includes a host of considerations. Examples of the host of considerations include but are not limited to age of the accesses in the CAM access storage module 205, order of the accesses, the number of accesses to an open bank and priority of the accesses. Various fields in the CAM access storage module 205 and the next access table module 210 may be searched using search capabilities of the CAM based architecture. Search results may then be used by the next table decision logic module 220 to determine which access is a best transaction to be processed by the memory controller 105 for a specific bank.

In an embodiment, the next table decision logic module 220 determines the best access from the next access table module 210 and the results of comparisons with the CAM access storage module 205.

In an embodiment, the CAM access storage module 205 is a CAM based access storage module.

In an embodiment, a read modify write operation when using the CAM based decision control module 110 starts when the read modify write operation is requested by the one or more users. The next table decision logic module 220 detects the read modify write operation and creates a read access request and a write access request. The CAM access storage module 205 stores a read operation with some additional bits identifying that the read operation is coupled with an associated write command. In an embodiment, the additional bits include a write flag bit and an entry location for the associated write command in the CAM access storage module 205.

In another embodiment, the CAM based decision control module 110 includes only the CAM access storage module 205, the next access table module 210, and the next table decision logic module 220. The next table decision logic module 220 uses one or more algorithms to determine the best next access. It uses results from the CAM access storage module 205 and the next access table module 210 to make this determination and includes a host of considerations like the age of the accesses in the CAM access storage module, the order of the accesses, the number of accesses to the open bank and the priority of the access. The CAM access storage module 205 is used to store each access requested of the controller for the one or more memory devices.

Figure 3:
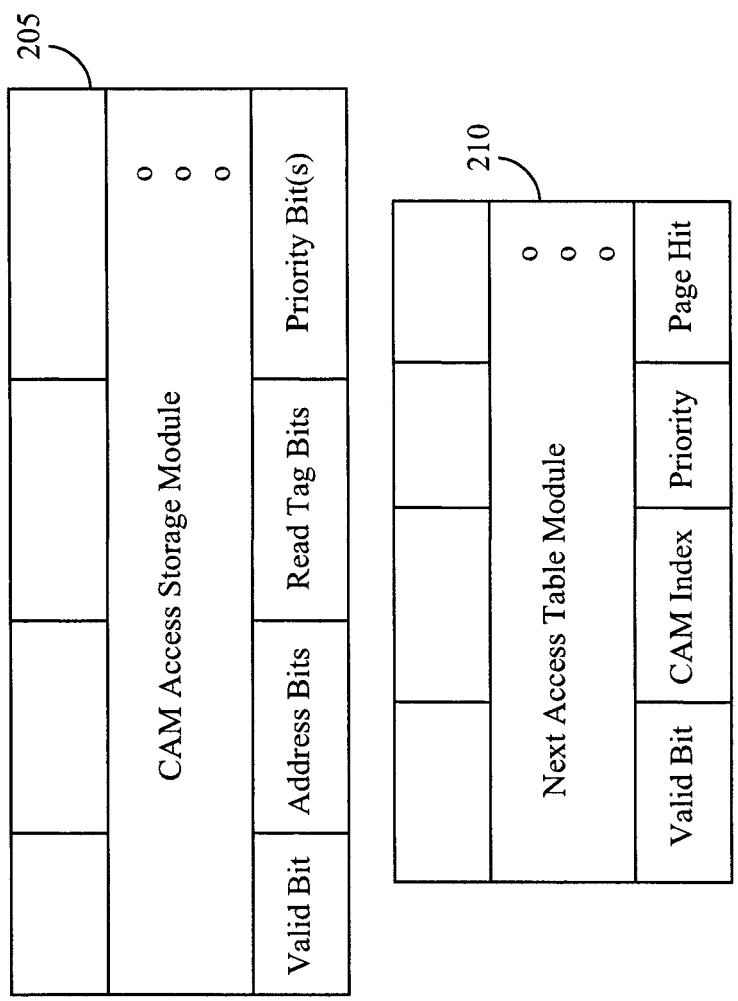
FIG. 3 is an exemplary representation of contents of a CAM access storage module and a next access table module.

FIG. 3 is an exemplary representation of contents of the CAM access storage module 205 and the next access table module 210.

Contents of the CAM access storage module 205 include one or more valid bits indicating if an entry is used or not, one or more address bits indicating a complete memory address, one or more read tag bits indicating an order of a requested read operation, one or more priority bits and complete next table information. In an embodiment, if there is a write operation then write data is also associated. The write data may be stored in conventional memory.

Contents of the next access table module 210 include one or more valid bits indicating if the entry is to be used, one or more priority bits indicating relative importance of an access, one or more page hit bits indicating if the access is within the open page, and an index into the contents of the CAM access storage module 205.

Figure 4:
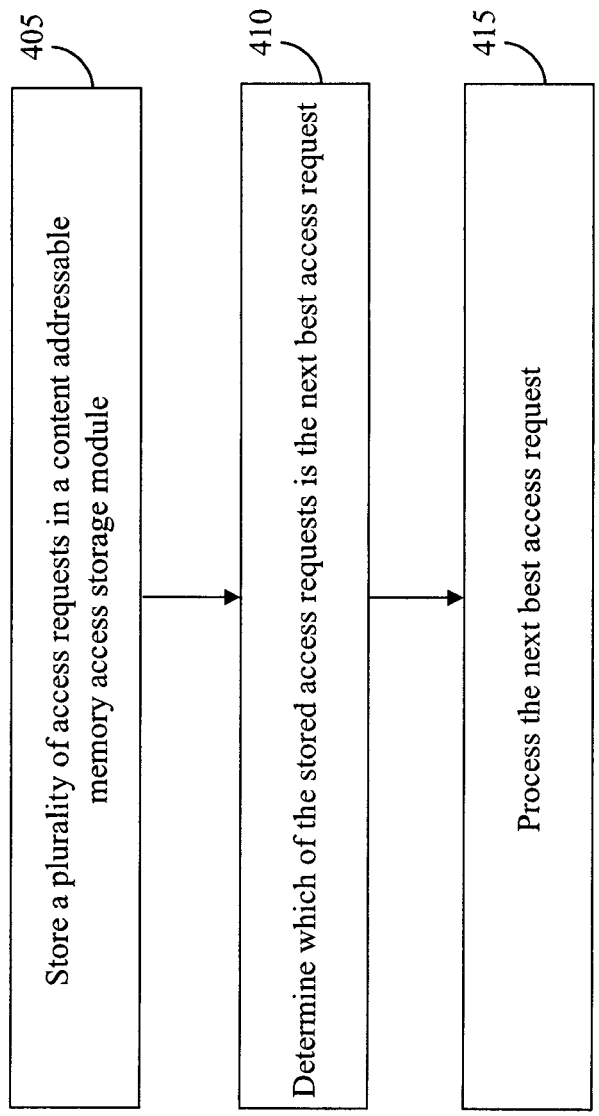
FIG. 4 illustrates a method of accessing a dynamic random access memory (DRAM).

FIG. 4 illustrates a method of accessing a dynamic random access memory (DRAM).

At step 405, a plurality of access requests is stored in a CAM access storage module. Every access requested of the memory controller for the DRAM is stored in the CAM access storage module. An allocation mechanism used by the CAM based decision control module controls the way in which entries to the CAM access storage module are written into. Initially writes to the CAM are done like a first in first out (FIFO) memory. A first entry is written into a first memory location. A second entry is written into a next memory location. This continues as each new entry is added. Loading entries in this manner allows the algorithm to understand the age of each entry. This is performed as the decision logic module needs to take into account how long the access has been in the memory. In an embodiment, accesses are prevented from aging too much.

The entries can be removed from the CAM in a random order, based on which the best or most efficient access is processed. In an embodiment, one metric for best is how old an access is. Older accesses have higher priority. Special logic is added to the memory so that when multiple accesses match during a search, a selection network determines which entry is oldest, by comparing the entry value of each match to the entry value of the oldest entry. Taking the age of an access into account helps in the determination of the best access. When the oldest entry is removed, the pointer to the oldest entry moves to the next occupied location so that the oldest location is preserved.

At step 410, a next best access request is determined from the stored access requests stored in the CAM access storage module. The determining includes holding the next best access request for a period of time. A scheduling mechanism implemented by the CAM based decision control module uses the next access table. The CAM access storage module records all accesses that have come into the memory controller and the next access table holds the best next access on a per bank basis. The next access table is updated on each access by comparing the current best access to any new access that comes in to the CAM based decision control module. If the new access is better, it is loaded into the next access table. If the new access is not better it is simply added to the rest of the accesses in the CAM access storage module.

At step 415, the next best access request is processed. A transaction is serviced using a transaction servicing mechanism. When the DRAM has an available cycle the next best access in the next access table is processed. The entry is read from the memory and processed. In an embodiment, the DRAM contains all the information required to process the transaction. The next access table just holds the minimum information needed to identify the memory entry location and make scheduling decisions and the memory entry is marked as invalid and the next access table is loaded with a new best access. The new best access is determined by checking the CAM access storage module for an access request to an open page of a DRAM bank as well as an access request to the DRAM bank. If there is an access to the open page, it takes priority. If there is no access to the open page then an access to the DRAM bank takes priority. If there are multiple accesses within either of these cases the selection logic uses the best determinants to select between the accesses. Examples of best determinants include but are not limited to age, priority, number and order.

In an embodiment, when implementing the above described mechanisms data ordering is performed by maintaining order of the plurality of access requests for the processing. Detection of data collisions and management of the data collisions is also performed.

Proper data ordering needs to be maintained while accesses are being selected for the processing. For example, if a write access request is followed by a read access request it is important not to reorder these accesses so that the read is done prior to the write since incorrect data would be read from the memory. In order to eliminate these re-ordering issues when a read access request is loaded into the CAM access storage module a search is done for a write access request to that same location. If a write access request to that location exists, the read access request must be flagged so that it occurs after the write access request. This is done by stalling the read operation. It is saved and is not allowed to be loaded into the CAM access storage module until after the associated write operation is completed. The associated write operation has its priority reset to be higher than other accesses so that it will be completed sooner, allowing the associated read to uninstall. A similar case is when a read operation is followed by a write it is important that the write not be done prior to the read. In an embodiment, this case is taken care of by doing a search for a read access request to the write location and implementing using a similar method as described above.

The detection of data collisions and management of the data collisions also needs to be taken into consideration. Other cases that can be detected using the CAM occur when reads to the same location follow each other or when writes to the same location follow each other. For example, if a read comes in and a read to that location already exists, the read accesses are processed normally if there is no intervening write. If a write operation comes in and a write operation already exists, the second write operation will overwrite the previous write operation without impacting data integrity if there is no intervening read. If data masking is used to write only certain portions of the data block, then the second write will overwrite only the appropriate portions of the first write, and the resulting data mask will be an OR function of the unmasked bits of both writes. The first write operation can be ignored and is cleared from the access storage module. In an embodiment, if many write operations are being made to the same address a significant savings in memory bandwidth results since only one access request is actually processed.

The foregoing description sets forth numerous specific details to convey a thorough understanding of embodiments. However, it will be apparent to one skilled in the art that embodiments may be practiced without these specific details. Some well-known features are not described in detail. Other variations and embodiments are possible in light of above teachings, and it is thus intended that the scope not be limited by this Detailed Description, but only by the Claims.

What is claimed is:

1. A memory controller for controlling a dynamic random access memory (DRAM), the memory controller comprising:
   a content addressable memory (CAM) based decision control module for determining a next best access request for the DRAM, the CAM based decision control module comprising:
   a CAM access storage module for storing a plurality of access requests, the CAM access storage module including:
      address bits indicating a complete memory address;
      bits indicating if an entry is used or not;
      tag bits indicating an order of a requested read operation;
      priority bits; and
      next table information;
   a next access table module for storing the next best access request; and
   a decision logic module for determining the next best access request based on results from the CAM access storage module and the next access table module; and
   a DRAM access control interface for implementing signaling required to access the DRAM.

2. The memory controller of claim 1, wherein the CAM based decision control module further comprises a DRAM scheduler for scheduling the plurality of access requests.

3. The memory controller of claim 1, wherein the next access table module includes:
- bits indicating if an entry is to be used;
- priority bits including relative importance of an access;
- page hit bits indicating if an access is within an open page; and
- an index into contents of the CAM access storage module.

4. The memory controller of claim 1, wherein the decision logic module determining the next best access request by implementing an algorithm.

5. The memory controller of claim 1, further comprising an interface for connecting the DRAM access control interface with memory.

6. The memory controller of claim 5, wherein the DRAM access control interface creates signals and timing to control read and write process with the memory.

7. A method of accessing a dynamic random access memory (DRAM), the method comprising:
- storing a plurality of access requests in a content addressable memory access storage module, the CAM access storage module including:
  - address bits indicating a complete memory address;
  - bits indicating if an entry is used or not;
  - tag bits indicating an order of a requested read operation;
  - priority bits; and
  - next table information;
- determining which of the stored access requests is a next best access request based on results from the CAM access storage module and the next access table module; and
- processing the next best access request.

8. The method of claim 7, wherein the determining comprises at least one of:
- determining an access request to an open page of a DRAM bank; and
- determining the access request to the DRAM bank.

9. The method of claim 7, wherein the determining comprises:
- holding the next best access request for a period of time.

10. The method of claim 7 further comprising:
- maintaining order of the plurality of access requests for the processing.

11. The method of claim 7 further comprising:
- detecting data collisions of the plurality of access requests for the processing.

12. The method of claim 11 further comprising:
- managing the data collisions of the plurality of access requests.

13. A method of operating a memory controller to control a dynamic random access memory (DRAM), the method comprising:
- determining a next best access request for the DRAM, wherein the next best access request is determined by a content addressable memory (CAM) based decision control module comprised in the memory controller
- storing a plurality of access requests, wherein the plurality of access requests are stored by a CAM access storage module comprised in the memory controller, the storing a plurality of access requests including storing access requests in a form comprising:
  - bits indicating if an entry is used or not;
  - address bits indicating a complete memory address;
  - tag bits indicating an order of a requested read operation;
  - priority bits; and
  - next table information;
- storing the next best access request, wherein the next best access request is stored by a next access table module comprised in the memory controller;
- determining the next best access request, by a decision logic module comprised in the memory controller, based on results from the CAM access storage module and the next access table module; and
- implementing signaling required to access the DRAM, wherein the signaling is implemented by a DRAM scheduler comprised in the memory controller.

14. The method of claim 13 further comprising:
- scheduling the plurality of access requests, wherein the plurality of access requests are scheduled by a DRAM scheduler comprised in the memory controller.

15. The method of claim 13, wherein the CAM access storage module further comprises:
- bits indicating if an entry is used or not;
- address bits indicating a complete memory address;
- tag bits indicating an order of a requested read operation;
- priority bits; and
- next table information.

16. The method of claim 13, wherein the next access table module comprises:
- bits indicating if an entry is too be used;
- priority bits including relative importance of an access;
- page hit bits indicating if an access is within an open page; and\
- an index into contents of the CAM access storage module; and
- the storing the next best access request includes storing the next best access request in a form comprising:
  - bits indicating if an entry is to be used;
  - priority bits including relative importance of an access;
  - page hit bits indicating if an access is within an open page; and
  - an index into contents of the CAM access storage module.

17. The method of claim 13 wherein determining the next best access request comprises:
- implementing an algorithm.

18. The method of claim 13, further comprising:
- connecting the DRAM access control interface with memory through an interface.

19. The method of claim 13 further comprising:
- creating signals and timing to control read and write process with memory, wherein the creating is performed by the DRAM access control interface.

* * * * *